(12) United States Patent
Zhang et al.

(10) Patent No.: US 7,837,897 B2
(45) Date of Patent: Nov. 23, 2010

(54) POLYMERIC DISPERSED LIQUID CRYSTAL LIGHT SHUTTER DEVICE

(75) Inventors: Guomin Zhang, McKinney, TX (US); Menting Tim Tsai, Plano, TX (US)

(73) Assignee: Polytronix, Inc., Richardson, TX (US)

( * ) Notice: Subject to any disclaimer, the term of this patent is extended or adjusted under 35 U.S.C. 154(b) by 47 days.

(21) Appl. No.: 12/430,179

(22) Filed: Apr. 27, 2009

(65) Prior Publication Data

US 2010/0271571 A1  Oct. 28, 2010

(51) Int. Cl.
*C09K 19/30* (2006.01)
*C09K 19/12* (2006.01)
*C09K 19/38* (2006.01)
*G02F 1/1333* (2006.01)
*G02F 1/1334* (2006.01)

(52) U.S. Cl. .............. 252/299.01; 349/56; 349/62; 349/88; 252/299.63; 252/299.66; 359/245; 359/254; 359/321

(58) Field of Classification Search ............ 252/299.01, 252/299.63, 299.66; 349/56, 62, 88; 359/245, 359/254, 321
See application file for complete search history.

(56) References Cited

U.S. PATENT DOCUMENTS

| | | | |
|---|---|---|---|
| 3,720,623 A | 3/1973 | Cartmell et al. | |
| 3,795,529 A | 3/1974 | Cartmell et al. | |
| 4,435,047 A | 3/1984 | Fergason | |
| 4,671,618 A | 6/1987 | Wu et al. | |
| 4,685,771 A | 8/1987 | West et al. | |
| 4,994,204 A | 2/1991 | Doane et al. | |
| 5,056,898 A | 10/1991 | Ma et al. | |
| 5,270,843 A * | 12/1993 | Wang | 349/90 |
| 5,307,187 A | 4/1994 | Sunohara et al. | |
| 5,498,365 A | 3/1996 | Nolan et al. | |
| 5,537,242 A | 7/1996 | Lim | |
| 5,686,017 A | 11/1997 | Kobayashi et al. | |
| 5,709,911 A | 1/1998 | Onishi et al. | |
| 5,776,367 A | 7/1998 | Matsui et al. | |
| 5,963,282 A | 10/1999 | Battersby | |
| 5,972,240 A | 10/1999 | Kobayashi et al. | |
| 5,993,689 A | 11/1999 | Kobayashi et al. | |
| 6,007,740 A | 12/1999 | Andou et al. | |
| 6,097,451 A | 8/2000 | Palmer et al. | |
| 6,144,359 A | 11/2000 | Grave | |
| 6,187,223 B1 | 2/2001 | Andou et al. | |
| 6,243,152 B1 | 6/2001 | Knox et al. | |
| 6,261,650 B1 | 7/2001 | Kobayashi et al. | |
| 6,271,899 B1 | 8/2001 | Lewis et al. | |
| 6,295,102 B1 | 9/2001 | Higa et al. | |
| 6,388,146 B1 | 5/2002 | Onishi et al. | |
| 6,579,470 B1 | 6/2003 | Jeon | |
| 6,905,740 B2 | 6/2005 | Weber et al. | |
| 7,236,151 B2 | 6/2007 | Doane et al. | |
| 2007/0275182 A1 | 11/2007 | Weber et al. | |

* cited by examiner

*Primary Examiner*—Shean C Wu
(74) *Attorney, Agent, or Firm*—Scott T. Griggs; Griggs Bergen LLP

(57) ABSTRACT

A polymer dispersed liquid crystal light shutter device and method for use of the same are disclosed. First and second substrates are disposed substantially parallel. A polymer binder system is interposed between the first and second substrates and a plurality of liquid crystals are dispersed in the polymer binder system. The liquid crystal shutter device is able to switch between a high light absorbing dark state and a low light absorbing transparent state, and visa versa, with a low driving voltage. The liquid crystal shutter device includes formulations of liquid crystal mixtures having nematic liquid crystals and polymer systems to provide a wide viewing angle, low driving voltage, high contrast ratio, for example.

28 Claims, 4 Drawing Sheets

POLYMERIC DISPERSED LIQUID CRYSTAL LIGHT SHUTTER DEVICE

TECHNICAL FIELD OF THE INVENTION

This invention relates, in general, to liquid crystal display technology and, in particular, to polymer dispersed liquid crystal (PDLC) light shutter devices that include formulations of liquid crystal mixtures having nematic liquid crystals and polymer systems to provide a wide viewing angle and low driving voltage, for example.

BACKGROUND OF THE INVENTION

A liquid crystal display can show an image using electro-optical characteristics of a liquid crystal, which is injected into a space defined by two substrates. The electro-optical characteristics of the liquid crystals appear when electric power is applied thereto. Such a liquid crystal display is classified as one of a variety of types including twisted nematic (TN), super twisted nematic (STN), dynamic scattering mode (DSM), and the aforementioned PDLC, for example. Liquid crystal shutters are useful in various applications concerning the transmittance of light through an aperture in which it should be possible to switch the shutter between a low transmission state and a high transmission state, in response to a change in the electric influence.

PDLCs consist of micron-size droplets of low-molecular weight nematic liquid crystals dispersed in a polymer binder system. A PDLC material is sandwiched between substrates having a transparent conducting electrode such as indium tin oxide, to form a shutter. Upon application of a voltage across the electrodes of the shutter, a switching occurs from an opaque, high scattering state to a clear, transparent state. PDLC materials are formed by phase separation of low-molecular weight liquid crystals from a homogeneous solution with pre-polymer or polymer. The size, shape and density of the liquid crystal droplets depend on the techniques implemented. Major factors affect droplet size and density in the polymerization-induced phase separation process: materials type, relative concentration and curing temperature, for example. The curing temperature affects the rate of polymerization, viscosity of the polymer, diffusion rate of the liquid crystal and solubility of the liquid crystal in the PDLC system. With existing shutters, the transmission requirements are satisfied by use of a high driving voltage, which, in turn, increases power consumption requirements and makes compliance with ever more rigid environmental or green certifications difficult. Solutions continue to be required that improve transmission without the need for ever increasing driving voltages.

SUMMARY OF THE INVENTION

A liquid crystal shutter and method for use of the same are disclosed that address the limitations of existing liquid crystal shutters. In one embodiment, a PDLC shutter device and method for use of the same are disclosed. First and second substrates are disposed substantially parallel and a polymer binder system is interposed between the first and second substrates. A plurality of liquid crystals are dispersed in the polymer binder system. The liquid crystal shutter device is able to switch between a high light scattering dark state and a low light scattering transparent state, and visa versa, with a low driving voltage. Embodiments of the teachings presented herein provide a PDLC light shutter device consisting of formulations of the liquid crystal mixtures containing nematic liquid crystals and polymer systems.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
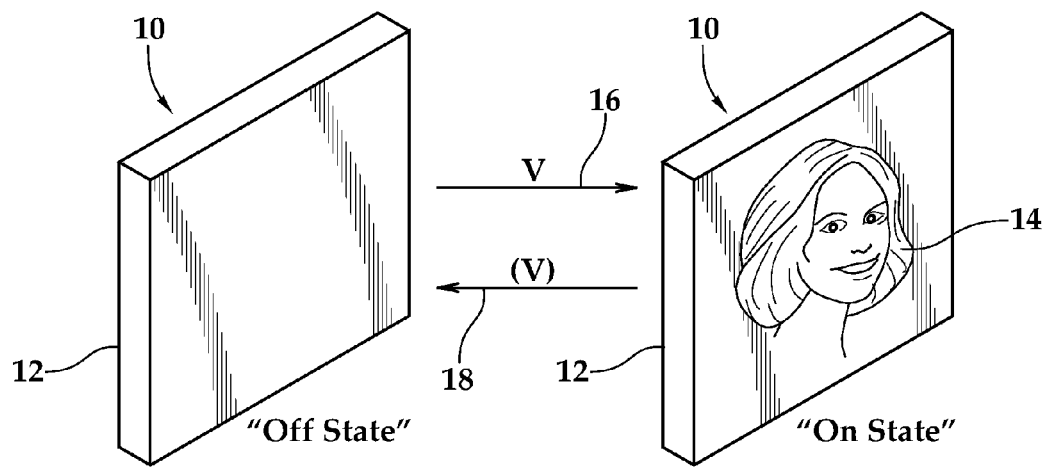
FIG. 1 is a diagrammatic view of one embodiment of a liquid crystal shutter being utilized to provide each of an opaque, high scattering state and a clear, transparent state.

Referring initially to FIG. 1, therein is depicted a polymeric dispersed liquid crystal light shutter device or, more succinctly, a liquid crystal shutter that is schematically illustrated and generally designated 10. Liquid crystals are substances that exhibit a phase of matter that has properties between those of a conventional liquid, and those of a solid crystal. For instance, a liquid crystal may flow like a liquid, but have the molecules in the liquid arranged and/or oriented in a crystal-like way. One type of liquid crystal, in the aforementioned polymer dispersed liquid crystal or PDLC, comprises micro-size droplets of low-molecular weight nematic liquid crystals dispersed in a polymer binder system. The liquid crystal shutter 10 includes a PDLC material interposed between substrates having transparent conducting electrodes. In FIG. 1, the liquid crystal shutter 10 is being utilized as a window 12, behind which, an individual 14 is standing. Upon application of a voltage, as shown by arrow 14, across the electrodes of the liquid crystal shutter 10, the liquid crystal shutter 10, switches from an opaque, high scattering state to a clear, transparent state, wherein the individual 14 can be seen standing behind the window 14. Upon removal of the voltage, as shown by arrow 18, the liquid crystal shutter 10 switches from the clear, transparent state to the opaque, high scattering state. It should be appreciated that although the liquid crystal shutter 10 is presented as a window, the teachings presented herein extend to any type of aperture including apertures for looking through, apertures having a need for clear and opaque states, switchable glass, privacy glass, smart windows, smart glasses. Further the light crystal shutter may be glass, plexiglass, polycarbonate or other material as will be discussed hereinbelow.

Figure 2:
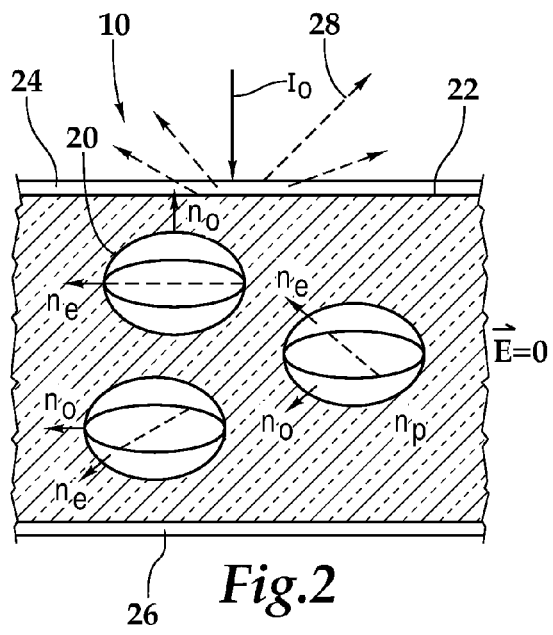
FIG. 2 is a diagrammatic view of one embodiment of the liquid crystal shutter depicted in FIG. 1 in a high scattering opaque state.

FIG. 2 depicts one embodiment of the liquid crystal shutter 10 wherein encapsulated liquid crystal microdroplets 20 are distributed uniformly in a polymer binder system 22, which may have the form of a plastic matrix, to create the PDLC material that is then sandwiched between two transparent substrates 24, 26. In one implementation, the substrates are positioned parallel to each other and include a transparent body having a transparent conducing layer therewith. The transparent body may be selected from materials consisting of glasses and plastics, for example. Moreover, the transparent body may include a refractive index from about 1.51 to about 1.52. The polymer binder system 22 may also have a refractive index from about 1.51 to about 1.52. It should be appreciated that the refractive indexes of the transparent substitutes 24, 26 and the polymer binder system 22 are matched as close as possible to improve transparency. The transparent conducting layer may comprise an indium-tin-oxide conducting layer or often suitable conducting layer, for example.

FIG. 2 shows a light scattering state 28 of the liquid crystal microdroplets 20 in the polymer binder system 22, in the absence of an applied electric field. Within each of the liquid crystal microdroplets 20, liquid crystals have tangential wall alignment; however, there is a two dimension random orientation of molecules in comparing various liquid crystal microdroplets 20. In terms of optical properties, this corresponds to a highly light scattering state.

Figure 3:
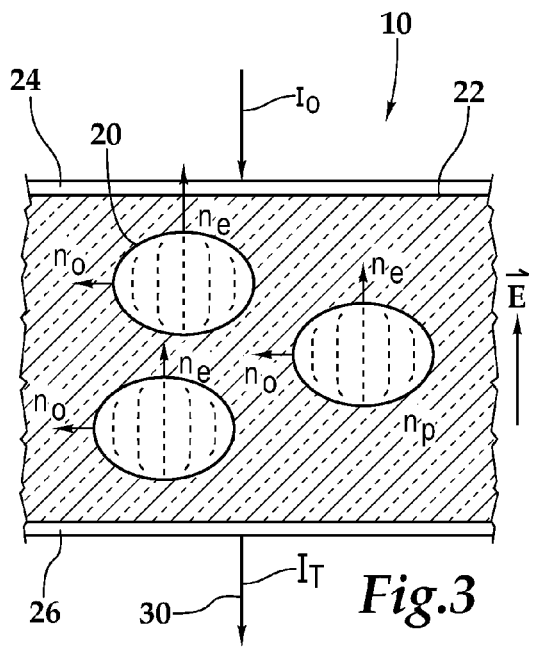
FIG. 3 is a diagrammatic view of one embodiment of the liquid crystal shutter depicted in FIG. 1 in a low scattering transparent state.

That is, in the absence of an applied electric field ($\vec{E}=0$), the optic axes of the liquid crystal microdroplets have no preferred direction in which to point in the plane, so that incident light encounters a mismatch between the refraction index $n_p$ of the matrix and the average refraction index ($\sim n_e$) of the liquid crystal microdroplets. The result of the mismatch is that the light is scattered and the liquid crystal shutter 10 appears opaque. On the other hand, if an electrical field is $\vec{E}$ applied as shown in FIG. 3, the orientations of molecules among various microdroplets is completely aligned. The applied electric field $\vec{E}$ aligns the directors within the droplets to a transparent state.

With reference to the light scattering state 28 of FIG. 2, the optic axis of the droplets is indicated by $n_e$. If the ordinary refractive index of the liquid crystal, $n_0$, matches that of the polymer binder system 22, $n_p$, then light scatters according to the value and orientation distribution of $n_e$. If $n_e > n_0$ and is 2-D randomly oriented (OFF state), light is strongly scattered. If $n_e$ is reoriented to be parallel to the direction of normally incident light, as in the case under an applied electric field, then, in principle, no light is scattered ($n_0 \sim n_p$). It should be appreciated that the liquid crystal microdroplets may be fabricated as spherical or elliptical shapes and that the shape of the liquid crystal microdroplets may change shape and size due to compression and other factors when the liquid crystal shutter is assembled.

As mentioned, in FIG. 3, in response to an application of an electric field ($\vec{E}=\uparrow$) across the transparent substrates 24, 26, the liquid crystal shutter provides transmission of light. The electric filed causes the optic axes of the liquid crystal microdroplets 20 to align parallel to the field and normal to the surfaces of the transparent substrates 24, 26. In this transmission state 30, incident light detects no mismatch between average refractive index of the liquid crystal droplet ($\sim n_0$) and the polymer binder system 22 ($n_p$) and light is transmitted so that the liquid crystal shutter 10 appears clear. As mentioned, by the application and removal of the driving voltage the liquid crystal shutter 10 may be alternated between the layout scattering state 28 of FIG. 2 and the light transmission state 30 of FIG. 3.

The liquid crystal shutter is more particularly a polymer dispersed liquid crystal light shutter device that includes liquid crystals dispersed in the polymer binder system. In one embodiment, the liquid crystals comprise a mixture product of at least one compound expressed by the general formula (I), at least one compound expressed by the general formula (II), at least one compound expressed by the general formula (III), at least one compound expressed by the general formula (IV), and at least one compound selected from the group of compounds expressed by the general formulas (V), (VI), and (VII); all of these general formulas presented in the following table, Table I, wherein $R_1$ through $R_7$ each respectively denote a straight-chain alkyl having 2 to 7 carbon atoms.

TABLE I

General Formulas (I) through (VII)

| General Formula (I) | 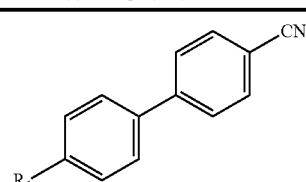 |
| --- | --- |
| General Formula (II) | 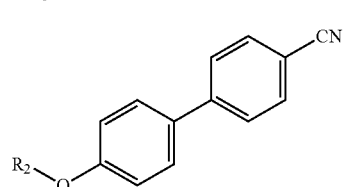 |
| General Formula (III) | 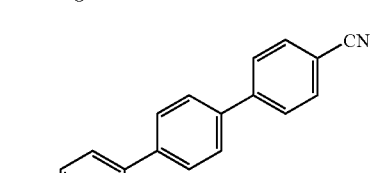 |
| General Formula (IV) | 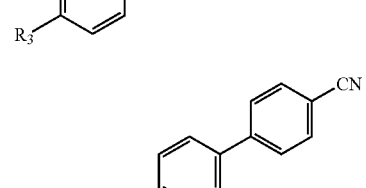 |
| General Formula (V) | 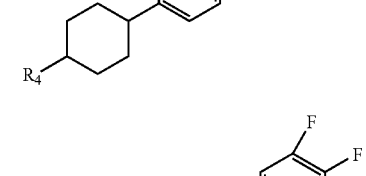 |

TABLE I-continued

General Formulas (I) through (VII)

General Formula (VI)

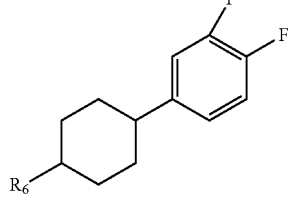

General Formula (VII)

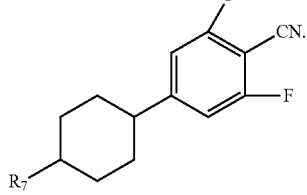

It should be appreciated that $R_1$ through $R_7$ may vary or be identical, depending on the application. Moreover, in one implementation, the liquid crystals further comprise a mixture product of at least two compounds expressed by the general formula (I).

The liquid crystals may comprise about 10% to about 50%, by weight of the liquid crystals, of a compound of the general formula (I); about 10% to about 20%, by weight of the liquid crystals, of a compound of the general formula (II); about 10% to about 15%, by weight of the liquid crystals, of a compound of the general formula (III); about 5% to about 15%, by weight of the liquid crystals, of a compound of the general formula (IV); and about 10% to about 15%, by weight of the liquid crystals, of at least one compound selected from the group of compounds expressed by the general formulas (V), (VI), and (VII).

In one embodiment, the polymer binder system includes epoxy resins and mercaptan curing agents. Additionally, a catalyst may be utilized. The present invention will now be illustrated by reference to the following non-limiting working examples wherein procedures and materials are solely representative of those which can be employed, and are not exhaustive of those available and operative. The following Examples and the accompanying Test Methods illustrate the advantages of the present liquid crystal shutter. The following glossary enumerates the components utilized in the Examples and Test Methods presented hereinbelow.

CAPCURE® 3-800 curing agent is a mercaptan (SH) terminated liquid curing agent which imparts rapid-cure characteristics to epoxy resins in combination with selected amines from Cognis S.A. (Cognis USA Headquarters in Cincinnati, Ohio).

CAPCURE® 40 curing agent is a pre-catalyzed mercaptan-based epoxy hardener that possesses extremely rapid-setting at ambient temperature from Cognis S.A. (Cognis USA Headquarters in Cincinnati, Ohio).

CAPCURE® EH-30 is a brand name for 2,4,6-tris(dimethylaminomethyl)phenol, which is $C_{15}H_{27}N_3O$ from Cognis S.A. (Cognis USA Headquarters in Cincinnati, Ohio).

EPON™ Resin 812 is an epoxy monomer for embedding resin systems from Shell Chemicals (Houston, Tex.); suitable substitutes include Embed 812 from Electron Microscopy Sciences (Hatfield, Pa.) and SPI-Pon 812 from SPI Supplies/Structure Probe, Inc. (West Chester, Pa.), for example.

EPON™ Resin 815 is a low viscosity liquid bisphenol A based epoxy resin containing a commercial grade of n-butyl glycidyl ether from Hexion Specialty Chemicals, Inc. (Columbus, Ohio).

EPON™ Resin 828 is an undiluted clear difunctional bisphenol A/epichlorohydrin derived liquid epoxy resin from Hexion Specialty Chemicals, Inc. (Columbus, Ohio).

ERL-4221™ resin, 3,4-epoxycyclohexyl methyl-3,4-epoxy-cyclohexanecarboxylate, is a cycloaliphatic, diepoxy functional organic compound that is a useful building block in the production of semi-hard to hard cured epoxy resins; available from Union Carbide Company (Danbury, Conn.).

ERL-4299™ resin, bis(3,4-epoxycyclohexyl)adipate, is a multi-functional epoxy that is a useful building block in the production of semi-hard to hard cured epoxy resins; available from Union Carbide Company (Danbury, Conn.).

Spacers may be spherical-shaped spacers dispersed between substrates to provide for spacing.

Example

Polymer System I (PS-I)

A polymer system having a refractive index of 1.5177 is made by mixing the ingredients of Table II.

TABLE II

| Formulation of PS-I |
|---|
| 83 g EPON ™ Resin 828 |
| 117 g EPON ™ Resin 812 |

Example

Polymer System II (PS-II)

A polymer system having a refractive index of 1.517 is made by mixing the ingredients of Table III.

TABLE III

| Formulation of PS-II |
|---|
| 93 g EPON ™ Resin 812 |
| 107 g EPON ™ Resin 815 |

Example

Polymer System III (PS-III)

A polymer system having a refractive index of 1.5178 is made by mixing the ingredients of Table IV.

TABLE IV

| Formulation of PS-III |
|---|
| 36 g EPON ™ resin 828 |
| 53 g ERL-4229 ™ resin |
| 11 g ERL-4221 ™ resin |

Example

Liquid Crystal Mixture I (LCM-I)

A liquid crystal mixture is made by stirring the ingredients of Table V in a beaker at 80° C. or higher until the mixture becomes an isotropic liquid. Stirring continues until the liquid crystal is well mixed in the isotropic state. The mixture is then cooled. As noted in Table V, the respective general formula class of the constituent compounds are also shown.

TABLE V

Formulation of LCM-I

| Compound | General Formula |
|---|---|
| 11.80 g 4-cyano-4-ethylbiphenyl | I |
| 42.70 g 4-cyano-4-pentylbiphenyl | I |
| 9.30 g 4-cyano-4-pentyloxybiphenyl | II |
| 15.09 g 4-phenyl-4-cyanoterphenyl | III |
| 11.12 g 4-(trans-4-pentylcyclohexyl)biphenylnitrile-4-butylcyclohexyl)cyclohexyl)benzene | IV |
| 10.00 g 3,4-difluoro-1-4-(trans-4-butylcyclohexyl)cyclohexyl)benzene | V |

Example

Liquid Crystal Mixture II (LCM-II)

A liquid crystal mixture was prepared substantially according to the procedures presented in Example LCM-I with the components noted in Table VI.

TABLE VI

Formulation of LCM-II

| Compound | General Formula |
|---|---|
| 11.80 g 4-cyano-4-ethylbiphenyl | I |
| 42.70 g 4-cyano-4-pentylbiphenyl | I |
| 9.30 g 4-cyano-4-pentyloxybiphenyl | II |
| 15.09 g 4-phenyl-4-cyanoterphenyl | III |
| 11.12 g 4-(trans-4-pentylcyclohexyl)biphenylnitrile-4-butylcyclohexyl)cyclohexyl)benzene | IV |
| 10.00 g 3,4-difluoro-1-(trans-4-propylcyclohexyl)Benzene | VI |

Example

Liquid Crystal Mixture III (LCM-III)

A liquid crystal mixture was prepared substantially according to the procedures presented in Example LCM-II with the components noted in Table VII.

TABLE VII

Formulation of LCM-III

| Compound | General Formula |
|---|---|
| 11.80 g 4-cyano-4-ethylbiphenyl | I |
| 42.70 g 4-cyano-4-pentylbiphenyl | I |
| 9.30 g 4-cyano-4-pentyloxybiphenyl | II |
| 15.09 g 4-phenyl-4-cyanoterphenyl | III |
| 11.12 g 4-(trans-4-pentylcyclohexyl)biphenylnitrile-4-butylcyclohexyl)cyclohexyl)benzene | IV |
| 10.00 g 3,4-difluoro-1-(trans-4-propylcyclohexyl)Benzonitrile | VII |

Example

Liquid Crystal Shutter I (LCS-I)

A liquid crystal shutter is made by stirring the ingredients of Table VIII in a beaker at ambient conditions until the mixture is homogenous. The mixture is applied individually to two substrates having indium-tin-oxide conducting layers. The substrates are then laminated together and cured at 65° C. for approximately 8 hours. Following curing, the liquid crystal shutter is cooled to room temperature.

TABLE VIII

Formulation of LCS-I 25 g LCM-I
20 g PS-III
23 g CAPCURE ® 3-800 curing agent
0.2 g Spacer Example Liquid Crystal Shutter II (LCS-II)

A liquid crystal shutter was prepared substantially according to the procedures presented in Example LCS-I with the components noted in Table IX.

TABLE IX

Formulation of LCS-II 25 g LCM-II
20 g PS-III
23 g CAPCURE ® 3-800 curing agent
0.2 g Spacer Example Liquid Crystal Shutter III (LCS-III)

A liquid crystal shutter was prepared substantially according to the procedures presented in Example LCS-I with the components noted in Table X.

TABLE X

Formulation of LCS-III 25 g LCM-III
20 g PS-III
23 g CAPCURE ® 3-800 curing agent
0.2 g Spacer Example Liquid Crystal Shutter IV (LCS-IV)

A liquid crystal shutter was prepared substantially according to the procedures presented in Example LCS-I with the components noted in Table XI.

TABLE XI

Formulation of LCS-IV 25 g LCM-I
20 g PS-I
23 g CAPCURE ® 3-800 curing agent
0.2 g Spacer Example Liquid Crystal Shutter V (LCS-V)

A liquid crystal shutter was prepared substantially according to the procedures presented in Example LCS-I with the components noted in Table XII.

TABLE XII

Formulation of LCS-V 25 g LCM-II
20 g PS-I
23 g CAPCURE ® 3-800 curing agent
0.2 g Spacer Example Liquid Crystal Shutter VI (LCS-VI)

A liquid crystal shutter was prepared substantially according to the procedures presented in Example LCS-I with the components noted in Table XIII.

TABLE XIII

Figure 4:
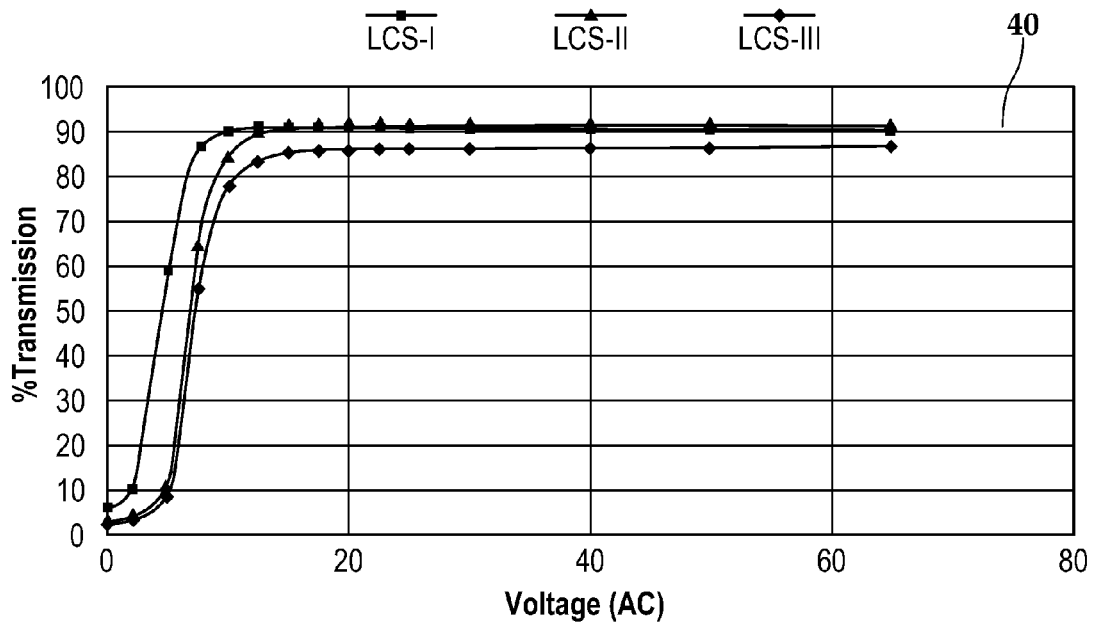
FIGS. 4 and 5 are graphs of percent transmission as a function of voltage for embodiments of the liquid crystal shutter of FIG. 1.
Figure 5:
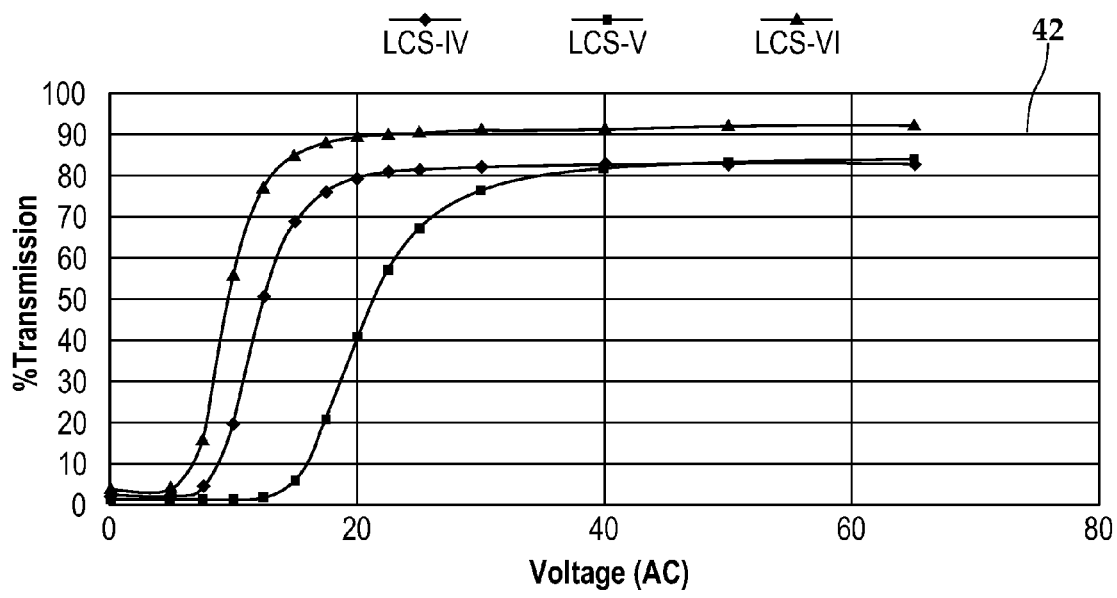

Formulation of LCS-VI 25 g LCM-III
20 g PS-I
23 g CAPCURE ® 3-800 curing agent
0.2 g Spacer Test Method I. With reference to FIGS. 4 and 5 and graphs 40, 42, percent transmission was measured as a function of voltage for embodiments of the liquid crystal shutter display of FIG. 1. In particular, the formulations according to Examples LCS-I through LCS-VI are depicted. With respect to FIG. 4, the drive voltages for Examples LCS-I through LCS-III are between about 12V and about 17V and the saturated transmissions vary between about 86% and about 92%. With respect to FIG. 5, the drive voltages for Examples LCS-IV through LCS-VI are between about 20V and about 40V and the saturated transmissions vary between about 78% and about 91%.

Figure 6:
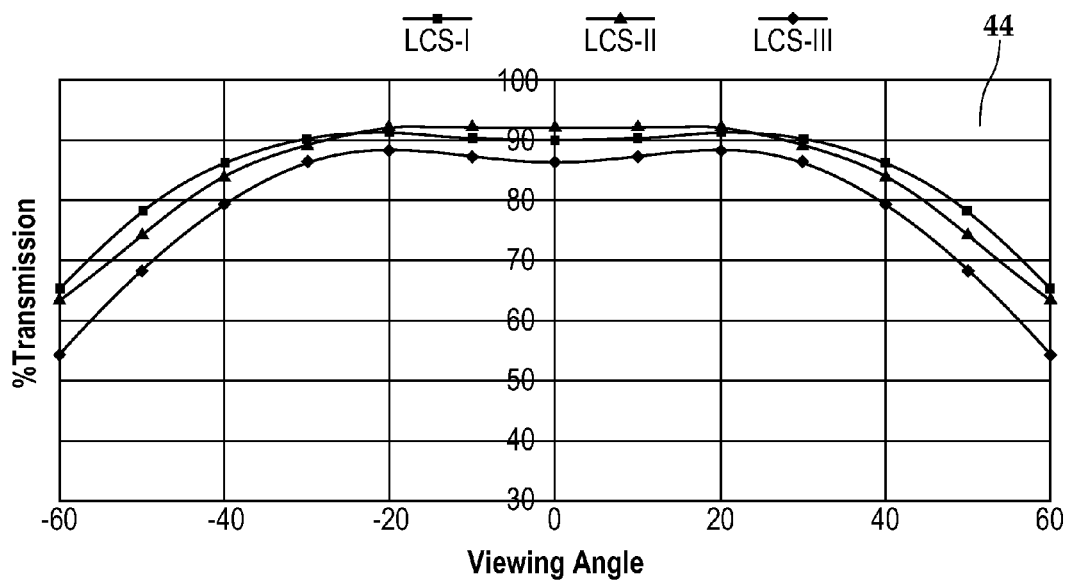
FIGS. 6 and 7 are graphs of transmission as a function of viewing angle for embodiments of the liquid crystal shutter of FIG. 1.
Figure 7:
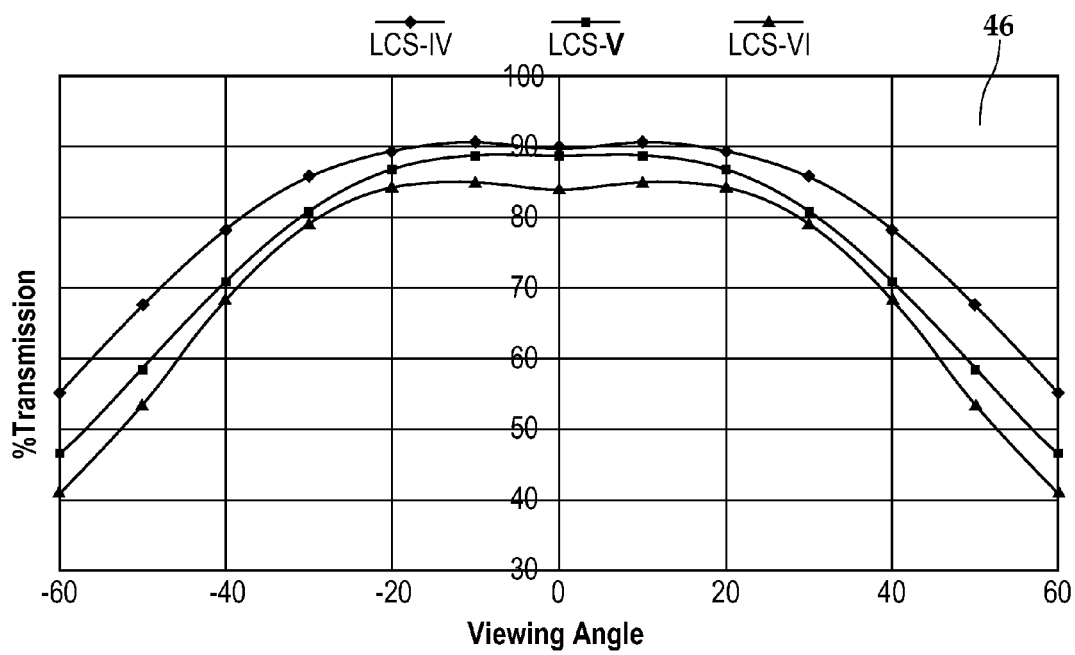

Test Method II. With reference to FIGS. 6 and 7 and graphs 44, 46, viewing angle as a function of percent transmission was measured for embodiments of the liquid crystal shutter display of FIG. 1 and particularly Examples LCS-I through LCS-VI. With respect to FIG. 6, the viewing angles are wide from positive 40 degrees to negative 40 degrees and there is less than 10% transmission drops as compared to saturated transmission. With respect to FIG. 7, the viewing angle is wide from positive 40 degrees to negative 40 degrees and the transmissions vary between about 78% and about 90%.

Figure 8:
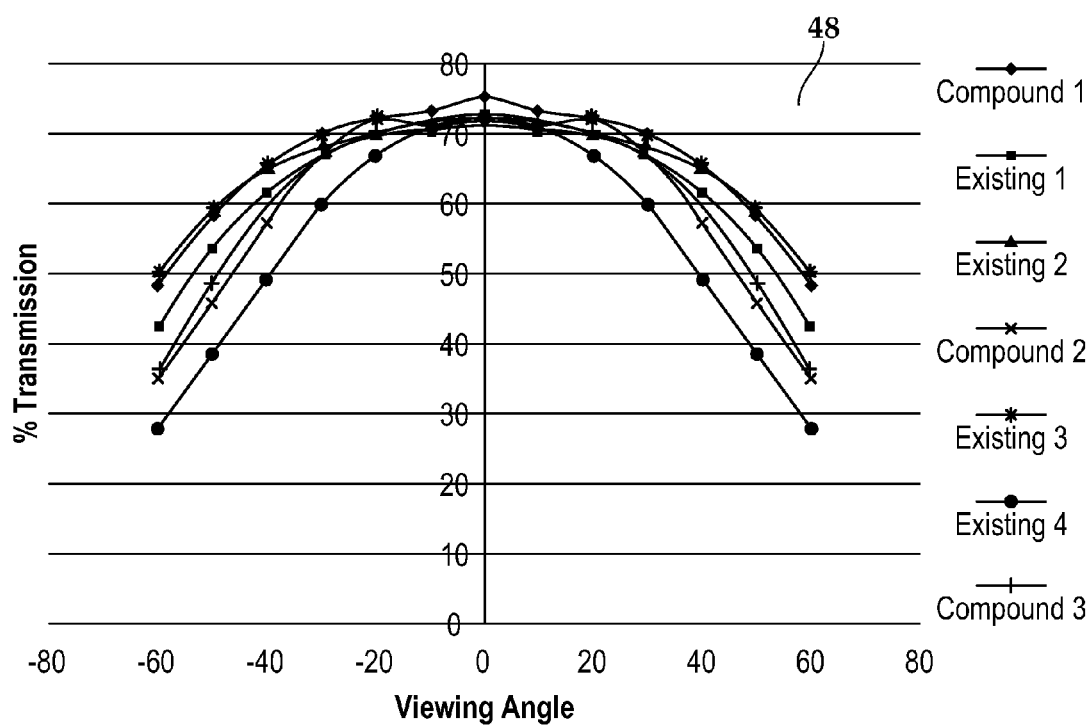
FIG. 8 is a graph of transmission as a function of viewing angle comparing the liquid crystal shutter of FIG. 1 to existing solutions.

Test Method III. Percent transmission was measured as a function of viewing angle comparing various liquid crystal shutters presented herein to existing liquid crystal shutter solutions. With reference to FIG. 8, Existing Solutions 1 and 2 are driven by 100V. Existing Solution 3 is driven by 100V and Existing Solution 4 is driven by 70V.

Test Method IV. Percent transmission of UV, visible, and IR light were measured during the OFF state to compare various liquid crystal shutters presented herein to existing liquid crystal shutter solutions. The results are noted in Table XIV. The Existing Solutions are the same as those presented for Test Method III.

TABLE XIV

Percent Transmission During OFF State

| Liquid Crystal Shutter Under Test | UV (Percent Transmission) | Visible (Percent Transmission) | IR (Percent Transmission) |
|---|---|---|---|
| Compound 3 | 0 | 1% | 6% |
| Compound 1 | 0 | 3% | 30% |
| Existing Solution 3 | 0 | 1% | 3% |
| Existing Solution 1 | 0 | 6% | 12% |
| Existing Solution 2 | 0 | 6% | 11% |
| Existing Solution 4 | 4% | 18% | 37% |

As Test Methods I-IV demonstrate, the liquid crystal shutters presented herein provide wide viewing angle, low driving voltage, and low percent transmission in the OFF state. Additionally, high contrast ratio and broad operating temperature range are provided.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A polymer dispersed liquid crystal light shutter device comprising:
   first and second substrates disposed substantially parallel;
   a polymer binder system interposed between the first and second substrates; and
   a plurality of liquid crystals dispersed in the polymer binder system, the plurality of liquid crystals comprise a mixture product of at least one compound expressed by the general formula (I), at least one compound expressed by the general formula (II), at least one compound expressed by the general formula (III), at least one compound expressed by the general formula (IV), and at least one compound selected from the group of compounds expressed by the general formulas (V), (VI), and (VII),

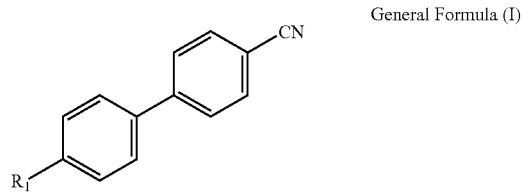

General Formula (I)

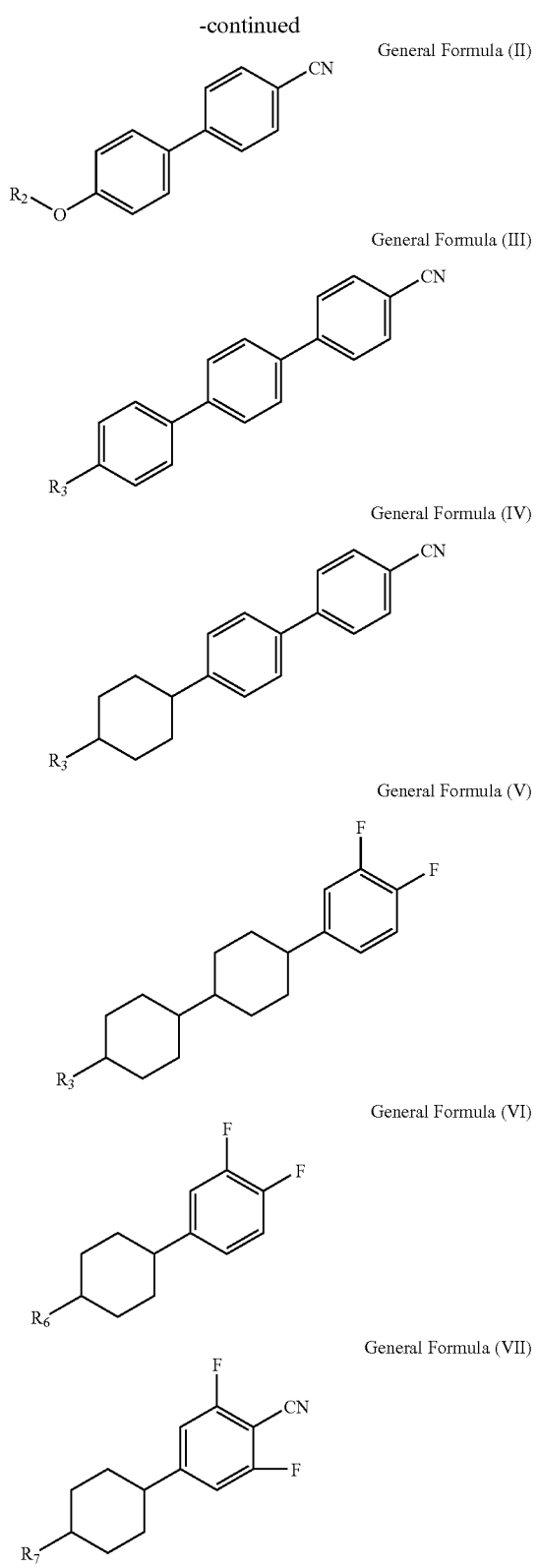

wherein $R_1$ through $R_7$ each respectively denote a straight-chain alkyl having 2 to 7 carbon atoms.

2. The polymer dispersed liquid crystal light shutter device as recited in claim 1, wherein the plurality of liquid crystals further comprise a mixture product of at least two compounds expressed by the general formula (I).

3. The polymer dispersed liquid crystal light shutter device as recited in claim 1, wherein the liquid crystal light shutter device is switched between a high light absorbing dark state and a low light absorbing transparent state by the application and removal of a voltage.

4. The polymer dispersed liquid crystal light shutter device as recited in claim 1, wherein the first and second substrates each further comprise a transparent body having a transparent conducing layer therewith.

5. The polymer dispersed liquid crystal light shutter device as recited in claim 4, wherein the transparent body is selected from materials consisting of glasses and plastics.

6. The polymer dispersed liquid crystal light shutter device as recited in claim 4, wherein the transparent body comprises a refractive index from about 1.51 to about 1.52.

7. The polymer dispersed liquid crystal light shutter device as recited in claim 4, wherein the transparent conducting layer comprises an indium-tin-oxide conducting layer.

8. The polymer dispersed liquid crystal light shutter device as recited in claim 1, wherein the polymer binder system further comprises epoxy resins and mercaptan curing agents.

9. A liquid crystal composition for a polymer dispersed liquid crystal light shutter device, the liquid crystal composition comprising:

a mixture product of at least one compound expressed by the general formula (I), at least one compound expressed by the general formula (II), at least one compound expressed by the general formula (III), at least one compound expressed by the general formula (IV), and at least one compound selected from the group of compounds expressed by the general formulas (V), (VI), and (VII),

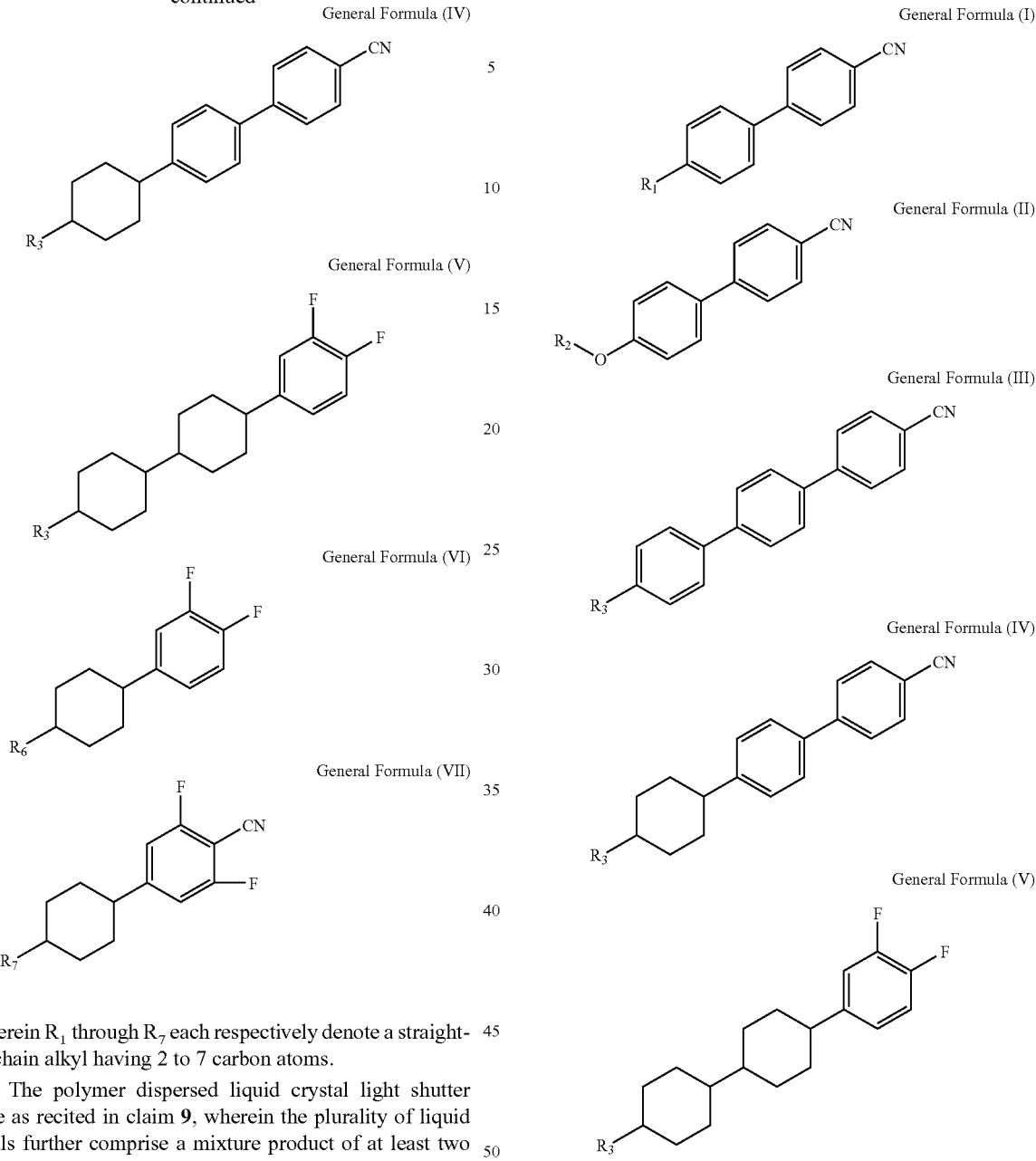

wherein $R_1$ through $R_7$ each respectively denote a straight-chain alkyl having 2 to 7 carbon atoms.

10. The polymer dispersed liquid crystal light shutter device as recited in claim 9, wherein the plurality of liquid crystals further comprise a mixture product of at least two compounds expressed by the general formula (I).

11. A polymer dispersed liquid crystal light shutter device comprising:

first and second substrates disposed substantially parallel;

a polymer binder system interposed between the first and second substrates; and a plurality of liquid crystals dispersed in the polymer binder system, the plurality of liquid crystals comprise a mixture product of at least one compound expressed by the general formula (I), at least one compound expressed by the general formula (II), at least one compound expressed by the general formula (III), at least one compound expressed by the general formula (IV), and at least one compound expressed by the general formula (V), wherein $R_1$ through $R_5$ each respectively denote a straight-chain alkyl having 2 to 7 carbon atoms.

12. The polymer dispersed liquid crystal light shutter device as recited in claim 11, wherein the at least one compound expressed by the general formula (I) comprises about 10% to about 50% by weight of the plurality of liquid crystals.

13. The polymer dispersed liquid crystal light shutter device as recited in claim 11, wherein the at least one compound expressed by the general formula (II) comprises about 10% to about 20% by weight of the plurality of liquid crystals.

14. The polymer dispersed liquid crystal light shutter device as recited in claim 11, wherein the at least one compound expressed by the general formula (III) comprises about 10% to about 15% by weight of the plurality of liquid crystals.

15. The polymer dispersed liquid crystal light shutter device as recited in claim 11, wherein the at least one compound expressed by the general formula (IV) comprises about 5% to about 15% by weight of the plurality of liquid crystals.

16. The polymer dispersed liquid crystal light shutter device as recited in claim 11, wherein the at least one compound expressed by the general formula (V) comprises about 5% to about 15% by weight of the plurality of liquid crystals.

17. A polymer dispersed liquid crystal light shutter device comprising:
   first and second substrates disposed substantially parallel;
   a polymer binder system interposed between the first and second substrates; and
   a plurality of liquid crystals dispersed in the polymer binder system, the plurality of liquid crystals comprise a mixture product of at least one compound expressed by the general formula (I), at least one compound expressed by the general formula (II), at least one compound expressed by the general formula (III), at least one compound expressed by the general formula (IV), and at least one compound expressed by the general formula (VI), General Formula (I)
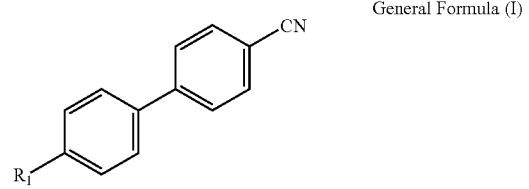

General Formula (II)
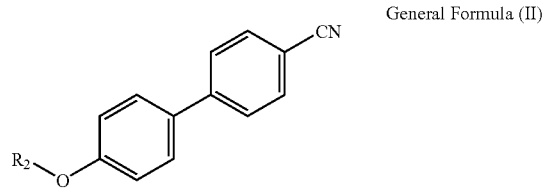

General Formula (III)
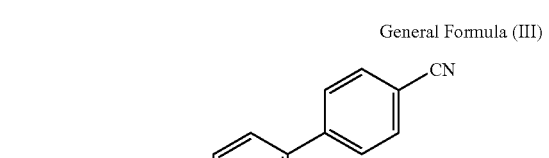

General Formula (IV)
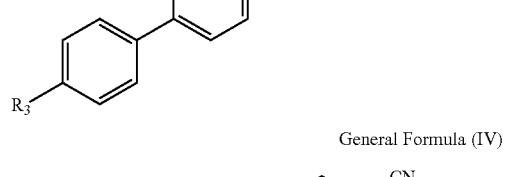

General Formula (VI)
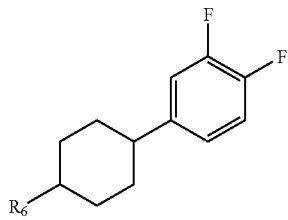

wherein $R_1$ through $R_4$ and $R_6$ each respectively denote a straight-chain alkyl having 2 to 7 carbon atoms.

18. The polymer dispersed liquid crystal light shutter device as recited in claim 17, wherein the at least one compound expressed by the general formula (I) comprises about 10% to about 50% by weight of the plurality of liquid crystals.

19. The polymer dispersed liquid crystal light shutter device as recited in claim 17, wherein the at least one compound expressed by the general formula (II) comprises about 10% to about 20% by weight of the plurality of liquid crystals.

20. The polymer dispersed liquid crystal light shutter device as recited in claim 17, wherein the at least one compound expressed by the general formula (III) comprises about 10% to about 15% by weight of the plurality of liquid crystals.

21. The polymer dispersed liquid crystal light shutter device as recited in claim 17, wherein the at least one compound expressed by the general formula (IV) comprises about 5% to about 15% by weight of the plurality of liquid crystals.

22. The polymer dispersed liquid crystal light shutter device as recited in claim 17, wherein the at least one compound expressed by the general formula (VI) comprises about 5% to about 15% by weight of the plurality of liquid crystals.

23. A polymer dispersed liquid crystal light shutter device comprising:
   first and second substrates disposed substantially parallel;
   a polymer binder system interposed between the first and second substrates; and
   a plurality of liquid crystals dispersed in the polymer binder system, the plurality of liquid crystals comprise a mixture product of at least one compound expressed by the general formula (I), at least one compound expressed by the general formula (II), at least one compound expressed by the general formula (III), at least one compound expressed by the general formula (IV), and at least one compound expressed by the general formula (VII), General Formula (I)
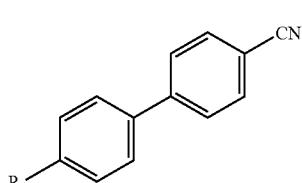

General Formula (II)
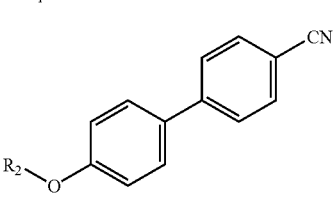

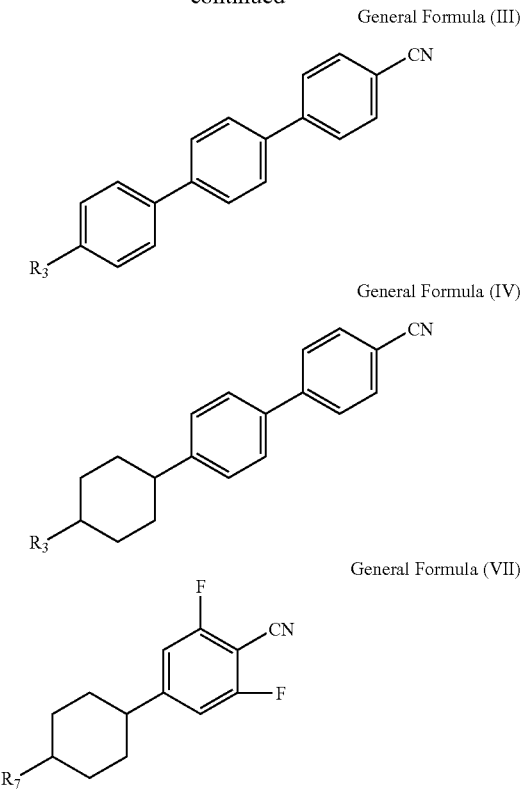

General Formula (III)

General Formula (IV)

General Formula (VII)

wherein $R_1$ through $R_4$ and $R_7$ each respectively denote a straight-chain alkyl having 2 to 7 carbon atoms.

24. The polymer dispersed liquid crystal light shutter device as recited in claim 23, wherein the at least one compound expressed by the general formula (I) comprises about 10% to about 50% by weight of the plurality of liquid crystals.

25. The polymer dispersed liquid crystal light shutter device as recited in claim 23, wherein the at least one compound expressed by the general formula (II) comprises about 10% to about 20% by weight of the plurality of liquid crystals.

26. The polymer dispersed liquid crystal light shutter device as recited in claim 23, wherein the at least one compound expressed by the general formula (III) comprises about 10% to about 15% by weight of the plurality of liquid crystals.

27. The polymer dispersed liquid crystal light shutter device as recited in claim 23, wherein the at least one compound expressed by the general formula (IV) comprises about 5% to about 15% by weight of the plurality of liquid crystals.

28. The polymer dispersed liquid crystal light shutter device as recited in claim 23, wherein the at least one compound expressed by the general formula (VII) comprises about 5% to about 15% by weight of the plurality of liquid crystals.

* * * * *